A. WHITE.
Improvement in Tipping Chairs.
No. 132,508. Patented Oct. 22, 1872.
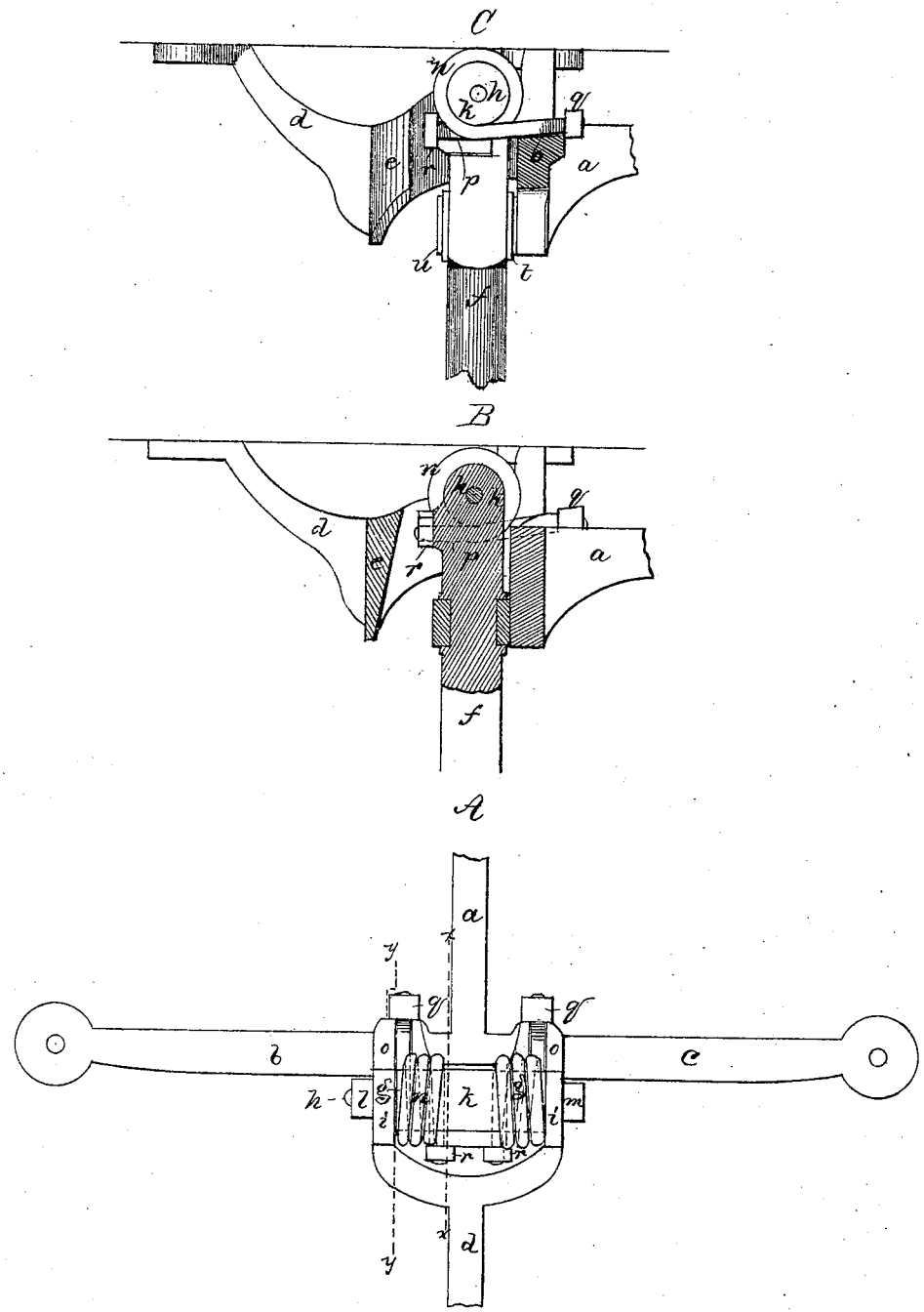

UNITED STATES PATENT OFFICE.

ABNER WHITE, OF CHELSEA, MASSACHUSETTS.

IMPROVEMENT IN TIPPING-CHAIRS.

Specification forming part of Letters Patent No. 132,508, dated October 22, 1872.

*To all whom it may concern:*

Be it known that I, ABNER WHITE, of Chelsea, in the county of Suffolk and State of Massachusetts, have invented an Improvement in Tipping-Chairs; and I do hereby declare that the following, taken in connection with the drawing which accompanies and forms part of this specification, is a description of my invention sufficient to enable those skilled in the art to practice it.

The invention relates to that class of chairs in which the seat is supported upon a stationary stool by means of a screw-spindle, which spindle has a rotative movement both to turn the seat and to adjust it as to height, said spindle usually extending down from a spider or frame, the arms of which extend to and are fastened under the seat-frame.

Such chairs have sometimes been also made with provision for tipping the seat, the spindle being connected to the spider by means of a pivotal and spring connection, which holds the seat normally in horizontal position but permits it to be tipped by the occupant of the chair.

My invention has particular reference to the arrangement of the springs used in this connection. In effecting this connection I make the spindle with a transverse tube or bore at its upper end or head and pivot the spindle to the spider by a means of a bolt-pin passing through this tube and two ears or bearings on the spider, and around each end of the spindle-tube I place a strong coiled spring, one end of which has a bearing in a slot in the top of the spider (held there by the stress of the spring) while the other end has a bearing in the slot in the side of the spindle-head, held there by the stress of its spring, each or either end of the spring being screw-threaded and provided with a nut, by which the stress of the spring may be regulated. It is this specific construction that constitutes my invention.

The drawing represents the construction embodying my invention.

A shows a plan of the spider and its spindle connection. B is a section on the line $x\ x$. C is a section on the line $y\ y$.

$a\ b\ c\ d$ denote the four spider-arms, formed in one piece, the arm $d$ extending from a yoke, $e$. $f$ denotes the screw-spindle. At its upper end or head this spindle has the lateral extensions $g$, and is bored through these extensions to form a tube or bearing for reception of the pivot-bolt $h$, which, passing through ears $i$, extending from the yoke $e$, and through the tube $k$, connects and pivots the spindle and spider together, the bolt being confined by a nut, $l$, and head $m$. Around each spindle extension $g$ a spring, $n$, is coiled, and in the spider-frame are made two bearing-slots, $o$, to receive and secure the corresponding ends of the two springs $n$, while in the opposite sides of the spindle-head are two slots, $p$, to receive the opposite ends of the two springs, the respective slots being so located that the stress of the springs holds their ends in the slots. Each end of each spring is shown as screw-threaded, and as bearing a nut, $q$ or $r$, and by means of these nuts the stress of the springs is easily regulated.

By loosening and removing the nuts and withdrawing the bolt-pin $h$, the spindle and spring can be readily separated from the spider, and the parts are as readily connected and the stress of the springs adjusted.

In tipping against the stress of the springs, the seat is arrested by the face $s$ of the spider striking the spindle-head, and a cushion, $t$, may be interposed to make an elastic contact, a similar cushion, $u$, being shown, to cushion the spider and spindle when the seat tips down to its normal position.

I claim—

1. The spindle $f$ formed with the tubular head, through which and the bearings $i$ the pivot-bolt $h$ passes, substantially as shown and described.

2. The springs $n$, each coiled around an extension of the tubular spindle-head, and the opposite ends of each confined by the slots $o\ p$, substantially as shown and described.

3. In combination with the spindle-head extensions, the springs, arranged and operating as shown and described, and screw-threaded at both ends, the nuts $q\ r$ for adjusting the stress of the springs at either or both ends.

4. In combination with the spring and pivotal connection, arranged as described, the elastic stops $t\ u$, substantially as shown and described.

ABNER WHITE.

Witnesses:
FRANCIS GOULD,
M. W. FROTHINGHAM.